United States Patent
Kawarai et al.

(10) Patent No.: US 9,240,710 B2
(45) Date of Patent: Jan. 19, 2016

(54) VIBRATION-POWERED GENERATOR

(75) Inventors: Mitsugu Kawarai, Tokyo (JP);
Takayuki Yamaguchi, Tokyo (JP);
Ryuta Iijima, Nagoya (JP); Ryoya Takahashi, Nagoya (JP); Keisuke Nishihara, Nagoya (JP)

(73) Assignee: SUMIDA CORPORATION, Tokyo (JP)

( * ) Notice: Subject to any disclaimer, the term of this patent is extended or adjusted under 35 U.S.C. 154(b) by 221 days.

(21) Appl. No.: 14/003,788

(22) PCT Filed: Mar. 21, 2012

(86) PCT No.: PCT/JP2012/001943
§ 371 (c)(1),
(2), (4) Date: Sep. 6, 2013

(87) PCT Pub. No.: WO2012/127859
PCT Pub. Date: Sep. 27, 2012

(65) Prior Publication Data
US 2013/0342037 A1 Dec. 26, 2013

(30) Foreign Application Priority Data
Mar. 22, 2011 (JP) .................................. 2011-063154

(51) Int. Cl.
*H02K 35/02* (2006.01)
*H02K 33/16* (2006.01)
(52) U.S. Cl.
CPC ...................................... *H02K 35/02* (2013.01)
(58) Field of Classification Search
CPC ........................................................ H02K 35/02
USPC ............................................................ 310/30
See application file for complete search history.

(56) References Cited

U.S. PATENT DOCUMENTS

| | | | |
|---|---|---|---|
| 2009/0289509 A1* | 11/2009 | Hoshi et al. | 310/12.33 |
| 2010/0117373 A1 | 5/2010 | Mochida et al. | |
| 2010/0277012 A1* | 11/2010 | Kobayashi | 310/30 |

FOREIGN PATENT DOCUMENTS

| | | | | |
|---|---|---|---|---|
| CN | 2153175 Y | 1/1994 | | |
| CN | 101465589 A | 6/2009 | | |
| CN | 101741209 A | 6/2010 | | |
| JP | 2006-296144 A | 10/2006 | | |
| JP | 2007-521785 A | 8/2007 | | |
| JP | 2007221960 | * | 8/2007 | H02K 41/03 |

(Continued)

OTHER PUBLICATIONS

International Search Report dated Jun. 19, 2012.

*Primary Examiner* — Terrance Kenerly
(74) *Attorney, Agent, or Firm* — McGinn IP Law Group PLLC (57) ABSTRACT

A vibration-powered generator (100) has a vibrating element (10) and a coil (40) arranged therearound, and is configured to obtain electromotive force by moving the vibrating element (10) relatively to the coil (40). The vibrating element (10) has a plurality of magnets (20a to 20d) arranged so as to oppose the pole-faces of the same polarity; end supporting portions (12, 13) which support the plurality of magnets from both ends in the direction of arrangement; and a cushioning (16). The cushioning (16) is held between the end supporting portion (12) and the magnet (20c), while being compressed under a stress exceeding the repelling force between the pole-faces of the magnets, so as to keep the magnets (20a to 20d) in a row without leaving a gap in between, overcoming the repelling force.

7 Claims, 7 Drawing Sheets

(56) References Cited

FOREIGN PATENT DOCUMENTS

| | | |
|---|---|---|
| JP | 2009-100523 A | 5/2009 |
| JP | 2009-118581 A | 5/2009 |
| JP | 2009-213194 A | 9/2009 |
| JP | 2010-279210 A | 12/2010 |
| WO | WO 2005/031952 A1 | 4/2005 |

* cited by examiner

VIBRATION-POWERED GENERATOR

TECHNICAL FIELD

The present invention relates to a vibration-powered generator configured to obtain electromotive force by moving a vibrating element with a built-in magnet relatively to a coil.

BACKGROUND ART

There has been a demand on simple power generators, capable of compensating or substituting disposal dry cells, from the viewpoints of sustaining or improving the global environment, and of ensuring emergency power supply. Of these sorts of power generators, there has been proposed a vibration-powered generator configured to generate induced current by allowing a permanent magnet to vibrate in a reciprocating manner inside a coil. Regarding this sort of technology, Patent Document 1 discloses a vibration-powered generator configured to allow a vibrating element, having two magnets arranged so as to oppose the pole-faces of the same polarity while keeping a gap in between, to vibrate in a reciprocating manner relative to a coil. The two magnets are connected to each other with a thin magnetic rod.

Patent Document 2 discloses a vibrating element having a plurality of magnets of the same size, arranged so as to oppose the pole-faces of the same polarity without leaving a gap in between, and fixed with nuts and bolts, and a vibration-powered generator using the same. According to the vibration-powered generator having the magnets arranged without leaving a gap in between, a sharp magnetic field gradient is formed at a position of contact between the pole-faces, in the direction orthogonal to the normal on the pole-faces (also occasionally referred to as "axial transverse direction", hereinafter), and thereby a high level of electromotive force may be obtained.

RELATED DOCUMENTS

Patent Documents

[Patent Document 1] Published Japanese Translation of PCT International Publication for Patent Application No. 2007-521785
[Patent Document 2] Japanese Laid-open patent publication NO. 2009-213194

SUMMARY OF THE INVENTION

The vibration-powered generator disclosed in Patent Document 1, however, suffers from a problem that a portion connecting the magnetic rod and the magnets may readily be broken when the vibrating element is applied with an impact force at both ends of the reciprocating vibration, since the magnets are connected only with a thin magnetic rod. In the vibration-powered generator disclosed in Patent Document 2, the magnets would collapse under pressure if clamping force of the bolts is excessive. The vibration-powered generator disclosed in Patent Document 2 is again anticipated to cause fracture of the magnets due to collision among the magnets or collision between the magnet and the bolt (or nut), if the clamping force of the bolts is insufficient enough to produce a gap among the magnets (loosen the magnets).

The present invention was conceived after considering the problems described above.

According to the present invention, there is provided a vibration-powered generator which includes a vibrating element having a plurality of magnets arranged so as to oppose the pole-faces of the same polarity; end supporting portions which support the plurality of magnets from both ends in the direction of arrangement; and a cushioning held between the end supporting portion and the magnets, while being compressed under a stress exceeding the repelling force between the pole-faces, so as to keep the plurality of magnets in a row without leaving a gap in between, overcoming the repelling force, and a coil arranged around the vibrating element, the vibration-powered generator being configured to obtain electromotive force by moving the vibrating element relatively to the coil.

Note that various constituents of the present invention are not always necessary be independent from each other, and may be such that a plurality of constituents are formed to give a single member, that a single constituent is formed by a plurality of members, that a certain constituent is a part of other constituent, and that a part of a certain constituent and a part of other constituent are common.

According to the present invention, there is provided a vibration-powered generator excellent in the mechanical strength and durability.

BRIEF DESCRIPTION OF THE DRAWINGS

The above and other objects, features and advantages of the present invention will be more apparent from the following description of certain preferred embodiments taken in conjunction with the accompanying drawings.

FIG. 7 FIG. 7A is a longitudinal cross sectional view of a vibrating element according to a modified example, taken along the axis of vibration.

DESCRIPTION OF EMBODIMENTS

Embodiment of the present invention will be explained referring to the attached drawings. Note that all similar constituents in all drawings will be given similar reference numerals, so as to appropriately avoid repetitive explanations.

Figure 1:
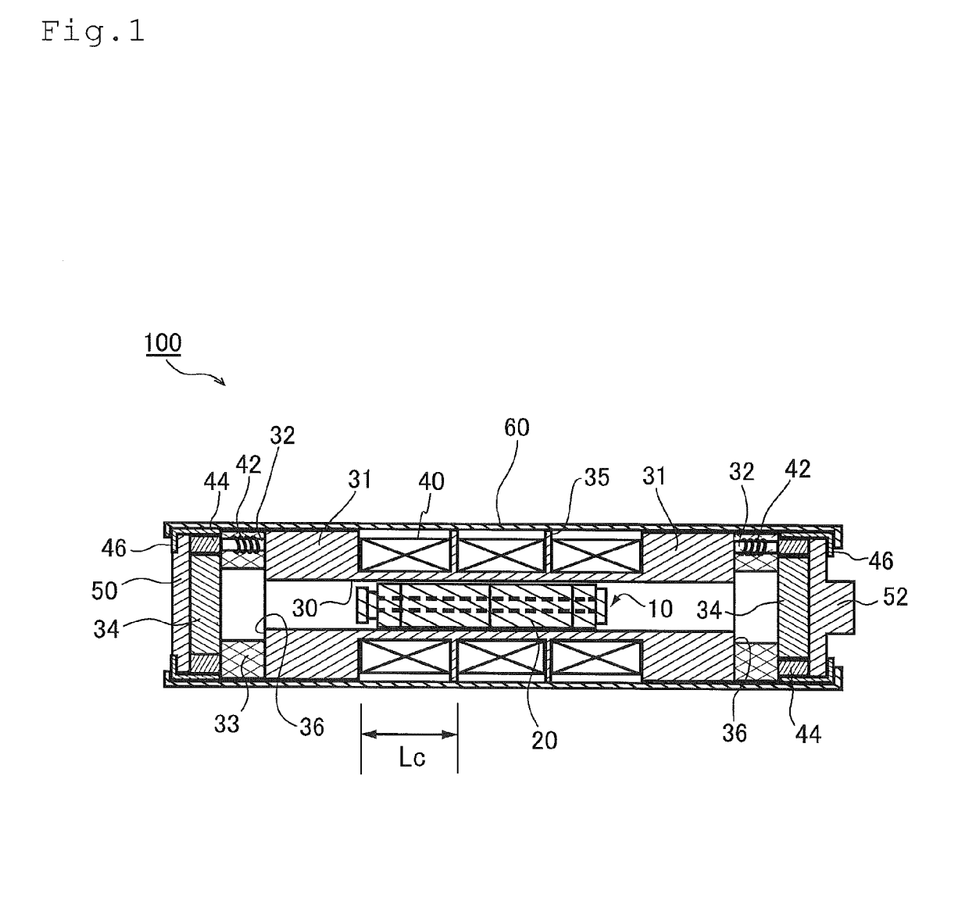
FIG. 1 A longitudinal cross sectional view of a vibration-powered generator according to one embodiment of the present invention, taken along the axis of vibration.
Figure 2:
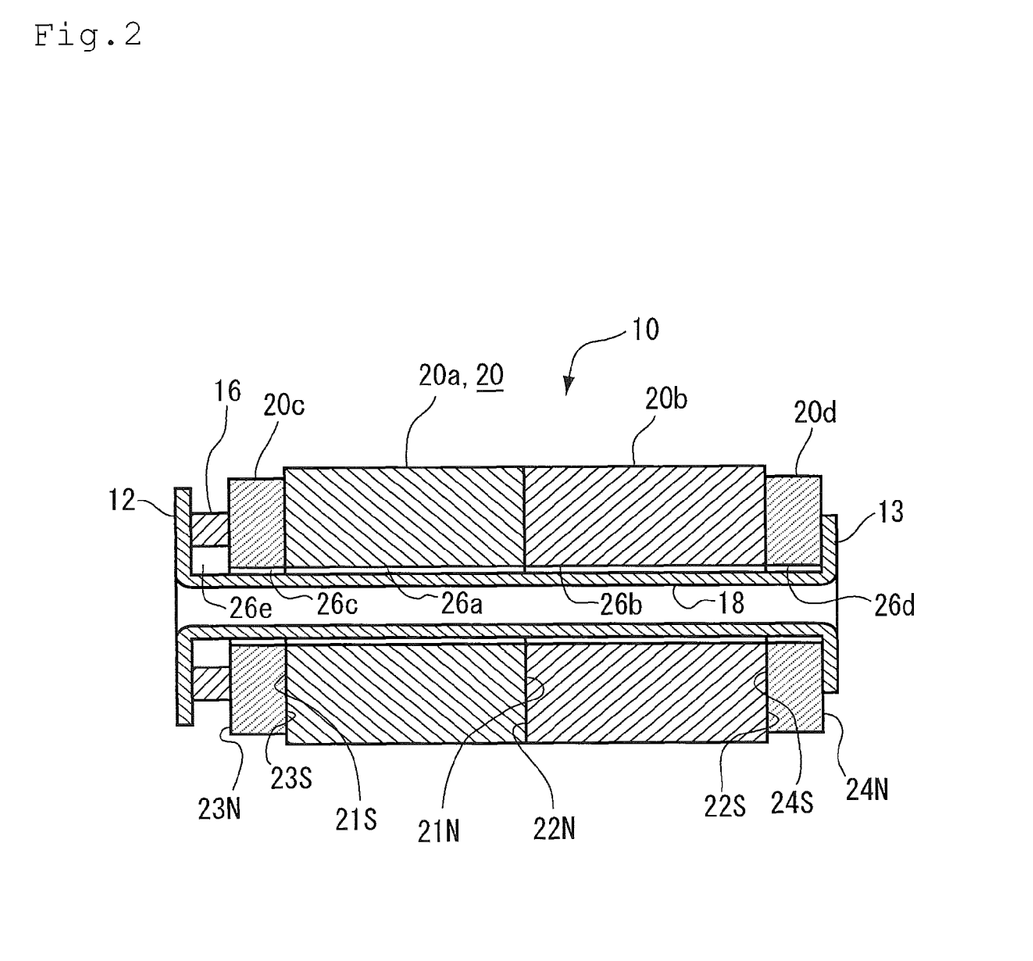
FIG. 2 A longitudinal cross sectional view of a vibrating element, taken along the axis of vibration.

FIG. 1 is a longitudinal cross sectional view of a vibration-powered generator 100 according to one embodiment of the present invention, taken along the axis of vibration. The direction of the axis of vibration lies in agreement with the lateral direction of FIG. 1. FIG. 2 is a drawing of a vibrating element 10, taken along the axis of vibration thereof.

First, the vibration-powered generator 100 of this embodiment will be outlined.

The vibration-powered generator 100 has the vibrating element 10 which includes a plurality of magnets 20 (20a to 20d), end supporting portions 12, 13 and a cushioning 16, and coils 40 arranged around the vibrating element 10, and is configured to obtain electromotive force by moving the vibrating element 10 relatively to the coils 40.

The magnets 20 are arranged so as to oppose the pole-faces (N-poles, S-poles) of the same polarity. The end supporting portions 12, 13 support the plurality of magnets 20 from both ends in the direction of arrangement. The cushioning 16 is held between at least one of the end supporting portions 12, 13 (the end supporting portion 12 in this embodiment) and the magnets 20, while being compressed under a stress exceeding the repelling force between the pole-faces, so as to keep the plurality of magnets 20 in a row without leaving a gap in between, overcoming the repelling force.

Next, the vibration-powered generator 100 of this embodiment will be detailed.

The magnets 20 include, at least, one or two or more (two, in this embodiment) of first magnets 20a, 20b, and second magnets 20c, 20d weaker in the magnetic force than the first magnets 20a, 20b, and arranged on the end side of the vibrating element 10. The second magnets may be arranged respectively at both ends of the vibrating element 10, or may be arranged only at one end. In other words, the vibrating element 10 may have two second magnets, or may have only a single second magnet. In this embodiment, exemplified is the case where one each, two in total, second magnets 20c, 20d are arranged at both ends of the vibrating element 10.

In the vibrating element 10 of this embodiment, the end supporting portions 12, 13 inwardly pressurize the plurality of magnets 20 at both ends thereof, so as to keep the magnets 20 in a row without leaving a gap in between, overcoming the repelling force between the pole-faces. Under such pressurizing force, the cushioning 16 is held while being compressed between the end supporting portion 12 and the magnets (more specifically, the second magnet 20c).

As illustrated in FIG. 1, inside a hollow pipe 30, the vibrating element 10 which moves in a reciprocating manner (vibrates) along the axis of the pipe 30 is housed. Around the pipe 30, the coils 40 are wound. The pipe 30 is composed of an insulating, non-magnetic material such as resin. At both ends of the pipe 30, for the purpose of preventing loosening of the coils 40, respectively provided are flanges 31 which are larger in diameter than the portion having the coil 40 wound therearound. At intermediate locations (two locations, in this embodiment) in the axial direction of the pipe 30, there are partition plates 35 for isolating the adjacent coils 40 formed so as to radially protrude. The partition plates 35 and flanges 31 have the same outer diameter. The pipe 30, the flanges 31 and the partition plates 35 may be configured by combining a plurality of components, or may be molded from a single material in an integrated manner.

The coils 40 are solenoid coils. In the vibration-powered generator 100 of this embodiment, a plurality of coils 40 are connected in series. Every adjacent coil 40 is reversed from each other in the polarity and the direction of winding. Coil pitch Lc, which represents the axial distance between the ends of the adjacent coils 40, is nearly equal to the axial length of the first magnets 20a, 20b (see FIG. 2). The flanges 31 at both ends of the pipe 30 have tie-up terminals 32 respectively formed thereon. Each tie-up terminal 32 is independently tied up with or wound with a wire end 42 of the coil 40. The tie-up terminal 32 tied up with the wire end 42 is enclosed in a resin-made terminal cover 33 so as to prevent wire breaking at the wire end 42. The terminal cover 33 has a ring form with a thickness almost equivalent to the length of the tie-up terminal 32.

The pipe 30 is housed in a cylindrical housing 60. The housing 60 typically has a diameter and a length same as those of a standardized dry cell of AA-type or so. At both ends of the housing 60, metal terminals 50, 52 are disposed. The terminal 50 corresponds to the negative pole. The terminal 50 has a flat disk form. The terminal 52 corresponds to a positive pole. The terminal 52 has a disk form with a projection just like that of a dry cell. Either one of, or both of the terminals 50, 52 are electrically isolated from the housing 60. If the housing 60 is composed of an electroconductive material such as metal, it is preferable, as illustrated in FIG. 1, to electrically isolate the terminals 50, 52 and the housing 60, by interleaving an insulating spacer such as a resin sheet 46 between the terminals 50, 52 and the housing 60. The resin sheet 46 is unnecessary if the housing 60 is composed of an insulating material.

Each of a pair of tie-up terminals 32 is independently connected, via an electroconductive spacer 44, to the terminal 50 or 52. The electroconductive spacer 44 has a ring form, and has in the hollow portion thereof a terminating component 34 for shock absorption. The terminating components 34 are disposed at both ends of the axis of vibration of the vibrating element 10.

The outer diameter of the magnets 20 of the vibrating element 10 is slightly smaller than the inner diameter of the pipe 30. The user holds the housing 60 of the vibration-powered generator 100, and shakes it in the axial direction. Accordingly, the vibrating element 10 vibrates in the hollow space of the pipe 30 and the terminal cover 33 in the axial direction. By allowing the vibrating element 10 to vibrate inside the pipe 30 wound with the coil 40, electromotive force is induced in the coil 40, and a potential difference appears between the terminals 50, 52. It is therefore possible to extract electric current into an external circuit (not illustrated) such as a capacitor connected to the terminals 50, 52. As an alternative to this example, in place of using the electroconductive spacers 44 and the terminals 50, 52, wires may be connected respectively to the pair of tie-up terminals 32, and the two wires may be drawn out from the housing 60 while being electrically isolated from the housing 60. A potential difference successfully appears between the two wires.

The vibration-powered generator 100 of this embodiment has a geometry and size of a dry cell, and may substitute the dry cell. In particular, it is suitably used for electronic instruments which are intermittently used such as remote controller. Electronic instruments, characterized by their longer stand-by time as compared with the operating time, have been known to much wastefully exhaust the dry cell due to stand-by power, whereas the vibration-powered generator 100 of this embodiment, shaken by the user to produce electricity only when it is used, successfully excludes the wasteful exhaustion by the stand-by power.

The ring-form terminal cover 33 preferably has an inner diameter same as, or larger than the inner diameter of the pipe 30. This is for the purpose of preventing the second magnet 20c or 20d, located at the end of the vibrating element 10 which travels from the center towards the end of the housing 60, from colliding against the terminal cover 33. In this embodiment, as illustrated in FIG. 1, the inner diameter of the terminal cover 33 is larger than the inner diameter of the pipe 30, forming a step between the flange 31 and the terminal cover 33.

The vibrating element 10 of this embodiment will further be detailed referring to FIG. 2.

The vibrating element 10 has a plurality of magnets. The vibrating element 10 of this embodiment has two first magnets and two second magnets, four in total. The number of magnets is however not limited thereto. All of the first magnets 20a, 20b and the second magnets 20c, 20d are permanent magnets. Neodymium magnets are preferably used by virtue of their strong magnetism.

The first magnets 20a, 20b are disposed in an intermediate portion of the vibrating element 10, and the pair of second magnets 20c, 20d are disposed at both ends of the vibrating element 10. The second magnets 20c, 20d are thinner than the first magnets 20a, 20b. Pole-face 21N of the N-pole of the first magnet 20a is brought into contact with pole-face 22N of the N-pole of the adjacent first magnet 20b. Pole-face 21S of the S-pole of the first magnet 20a is brought into contact with pole-face 23S of the S-pole of the second magnet 20c neighboring on the opposite side of the first magnet 20b. Pole-face 22S of the S-pole of the first magnet 20b is brought into contact with pole-face 24S of the S-pole of the second magnet 20d neighboring on the opposite side of the first magnet 20a.

The magnets 20 (20a to 20d) and the cushioning 16 respectively have through-holes 26 (26a to 26e) formed therein. The vibrating element 10 further has a core component 18 which is inserted through the through-holes 26 and has the end supporting portions 12 formed on both ends.

The core component 18 is composed of a non-magnetic cylindrical metal material. More specifically, aluminum, copper, brass and so forth are preferably used. On both ends of the core component 18 in this embodiment, respectively provided are the end supporting portions 12, 13 formed by caulking to have a diameter larger than that of the core component 18. The end supporting portions 12, 13 are formed by bending both end portions of the core component 18 at right angles and then forged into flanges, on which the end faces of the magnets 20 are supported.

The cushioning 16 is composed of a viscoelastic resin material including rubber, or an elastic element such as spring. The cushioning 16 may have a geometry of ring, disc and so forth, although not specifically limited. In this embodiment, the cushioning 16 is exemplified as a ring (O-ring component) having the through-hole 26e pierced at the center thereof. This sort of O-ring component may be composed of nitrile rubber (NBR), hydrogenated nitrile rubber (HNBR), fluorine-containing rubber (FKM), silicone rubber (VMQ), etylene-propylene rubber (EPDM), chloroprene rubber (CR), acryl rubber (ACM), butyl rubber (IIR) or urethane rubber (U). In particular, nitrile rubber (NBR), ethylene-propylene rubber (EPDM) or urethane rubber (U), known for their excellent wear resistance and mechanical strength are preferable.

Figure 3:
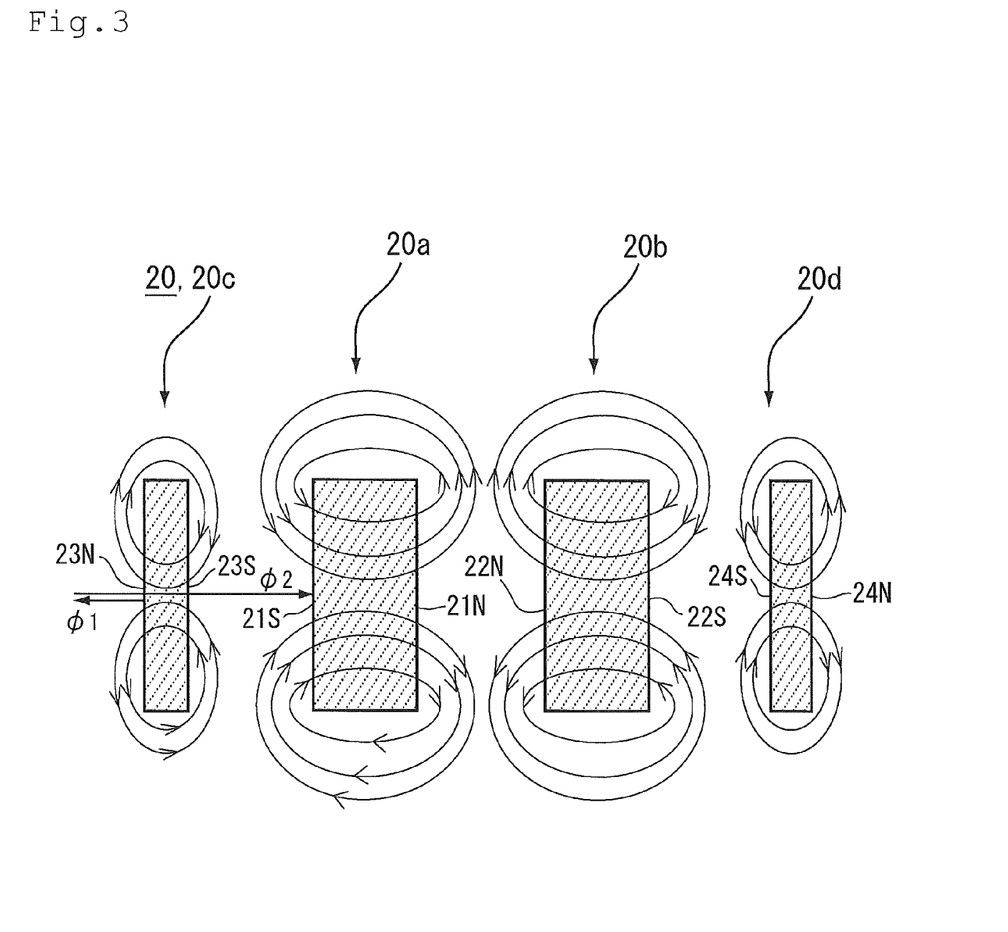
FIG. 3 A schematic drawing illustrating magnetic fluxes formed by the magnets.

In the vibrating element 10, on both sides of the first magnets 20a, 20b, there are disposed the second magnets 20c, 20d weaker in the magnetism than these first magnets. By virtue of this configuration, magnetic flux radiated from the flange surfaces and directed outwardly away from the axial direction may be reduced. Accordingly, the second magnets 20c, 20d are successfully prevented from being attracted by the terminals 50, 52, even when the reciprocating vibrating element 10 comes close to both ends of the housing 60. The principle will be explained referring to FIG. 3. FIG. 3 is a schematic drawing illustrating magnetic fluxes formed by the magnets 20. In FIG. 3, the magnets 20 are illustrated as spaced from each other, for the convenience of explanation.

By the magnetic fluxes respectively radiated from the pole-faces 21N, 22N of the N-pole of the first magnets 20a, 20b, the magnetic flux in the axial transverse direction is excited. Similarly, by the magnetic flux which radiates from the pole-face 21N of the N-pole towards the pole-face 21S of the S-pole of the first magnet 20a, and the magnetic flux which radiates from the pole-face 23N of the N-pole towards the pole-face 23S of the S-pole of the second magnet 20c, the magnetic flux in the axial transverse direction is excited. On the other hand, divergence in the axial direction of magnetic flux $\phi 1$ radiated from the pole-face 23N of the N-pole of the second magnet 20c, weaker in the magnetism than the first magnet 20a, is restricted while being repelled by the magnetic flux $\phi 2$ which is incident at right angles on the pole-face 21S of the S-pole of the first magnet 20a which is stronger in the magnetism. The same will also apply to a relation between the second magnet 20d and the first magnet 20b.

In this way, magnitude of the magnetic fluxes radiated from the second magnets 20c, 20d, disposed at both ends of the vibrating element 10, and directed outwardly away from the axial direction will be reduced to a large degree. Accordingly, the second magnets 20c, 20d will not be attracted by the metal-made terminals 50, 52, and thereby vibration of the vibrating element 10 is not inhibited.

The second magnets 20c, 20d have magnetism weaker than that of the first magnets 20a, 20b. The second magnets 20c, 20d in this embodiment are composed of a neodymium magnet similarly to the first magnets 20a, 20b, but are smaller in thickness than the first magnets 20a, 20b. Alternatively, the first magnets 20a, 20b may be composed of a neodymium magnet which is stronger in magnetism, and the second magnets 20c, 20d may be composed of a ferrite magnet which is weaker in magnetism. Both of the neodymium magnet and the ferrite magnet are brittle, and are poor in impact resistance. Accordingly, if the vibrating element 10 vibrates to collide onto the end portion of the housing 60, the second magnets 20c, 20d, particularly if made thin as in this embodiment, would be broken. Hence in the vibration-powered generator 100 of this embodiment, the soft terminating components 34 are disposed at the ends of the housing 60 so as to absorb shock of collision exerted on the vibrating element 10. In the vibrating element 10, the magnets 20 are arranged without leaving a gap in between to thereby prevent impact between the magnets, and the cushioning 16 is further interleaved between the end supporting portion 12 and the magnet 20 (second magnet 20c) to thereby absorb shock exerted on the magnet 20.

The reason why a magnetic field gradient is induced in the axial transverse direction, and a large induced electromotive force may be obtained by arranging the pole-faces of the adjacent magnets 20 into close contact will be explained in the next.

Figure 4A:
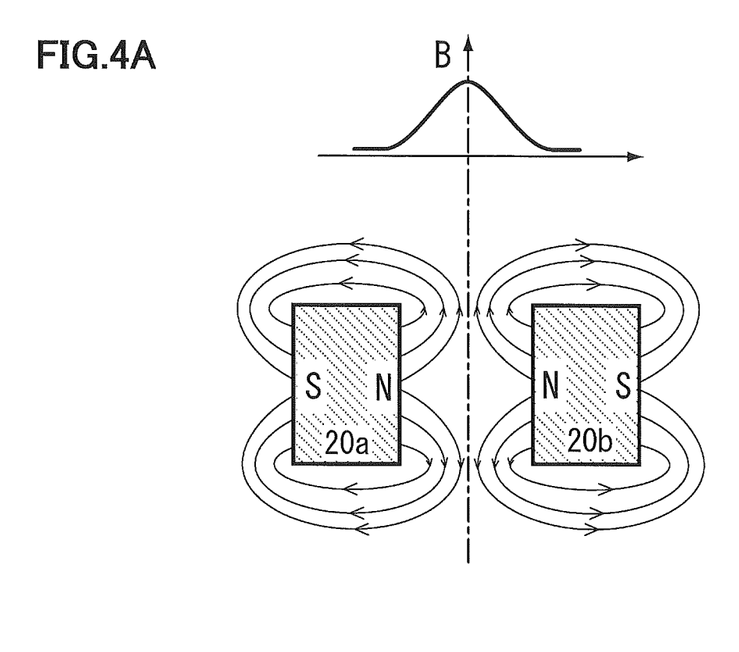
FIG. 4A is a schematic drawing illustrating two magnets arranged while opposing the N-poles thereof spaced by a predetermined distance, with a graph illustrating a magnetic flux density in the axial transverse direction.
Figure 4B:
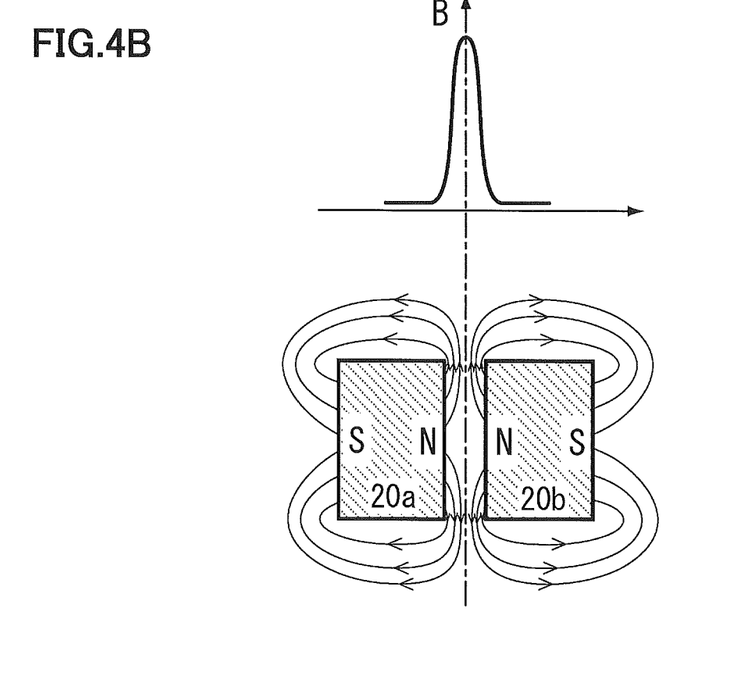
FIG. 4B is a schematic drawing illustrating two magnets spaced narrower than in FIG. 4A, with a graph illustrating a magnetic flux density in the axial transverse direction.

FIG. 4A is a schematic drawing illustrating lines of magnetic force around the magnets arranged so as to oppose the same pole-faces. FIG. 4B is a graph illustrating magnetic flux density B in the axial transverse direction, obtained by the magnets arranged so as to oppose the same pole-faces. Spatial distribution of the magnetic flux density B corresponds to magnitude of the magnetic field gradient. FIG. 4A illustrates two magnets 20a and 20b arranged so as to oppose the N-poles while keeping a predetermined distance in between, and FIG. 4B illustrates the magnets 20a and 20b spaced narrower than those illustrated in FIG. 4A. In these drawings, the magnetic fluxes radiated inwardly at right angles from the pole-faces (N-poles) of the magnets 20a and 20b are bent into the axial transverse direction. The magnetic field gradient is therefore induced in the axial transverse direction by inwardly opposing the same pole-faces, unlike the case where only a single magnet is used. Accordingly, if the magnets are vibrated inside the coil, a large induced electromotive force may be obtained with the aid of the thus-induced magnetic field gradient. As illustrated in FIG. 4B, induction of the magnetic field gradient becomes stronger by arranging the pole-faces of the magnets 20a and 20b more closer.

Conversely, if a fine gap remains between the magnets 20a, 20b, the spatial distribution of the magnetic flux in the axial transverse direction becomes broader, and thereby the induced electromotive force unfortunately decreases. For this reason, in the vibrating element 10 of this embodiment illustrated in FIG. 2, the pole-faces of the magnet 20 are brought into direct contact, so as to induce the magnetic field gradient in the axial transverse direction. Now the pole-face of the magnet 20 in this context means abase surface or coated surface of the magnet. The coating is exemplified by plating for rust prevention of the magnet 20. The direct contact between the pole-faces of the magnets 20 means that the pole-faces (coated surfaces) are brought into contact, without interleaving any component other than the magnet, such as a spacer.

Figure 5:
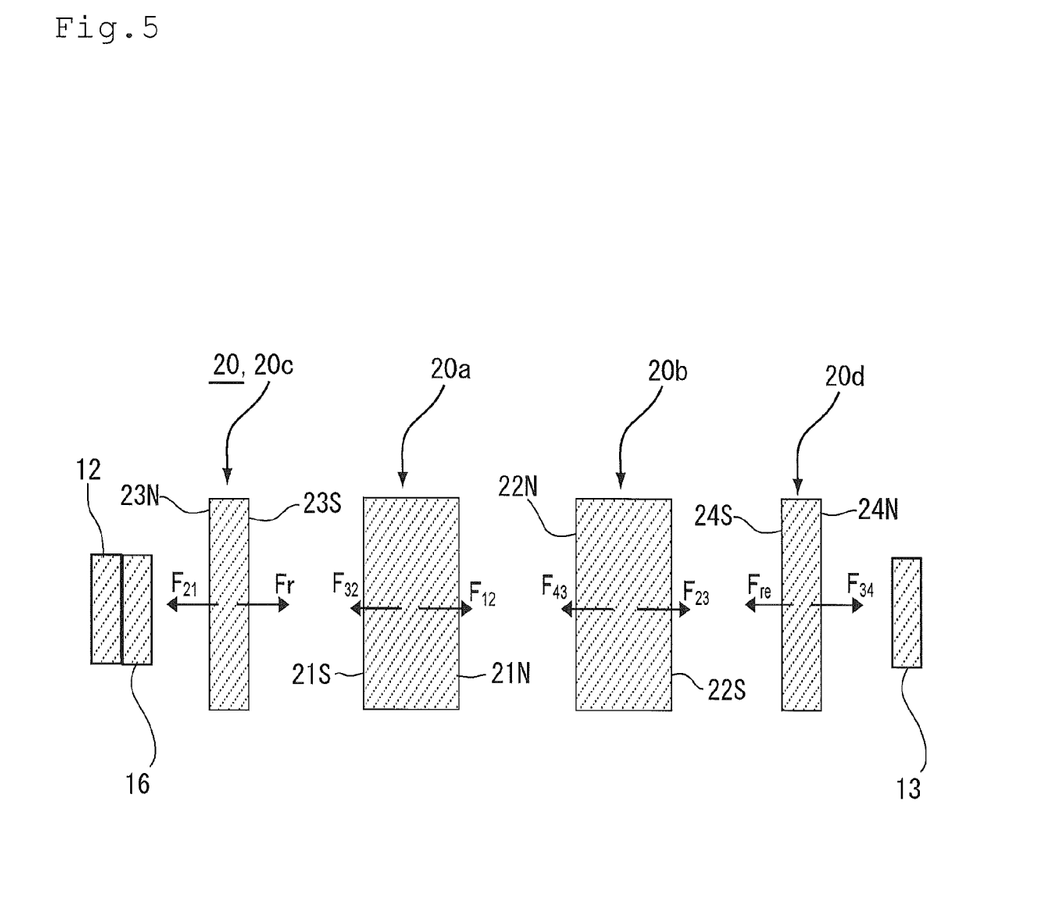
FIG. 5 A schematic drawing illustrating repelling force which acts between the magnets.

The adjacent magnets 20 are arranged in a row, while opposing the same pole-faces. Repelling force therefore acts between the magnets 20. FIG. 5 is a schematic drawing illustrating the repelling force acting on the magnets 20. Although the end supporting portions 12, 13, the cushioning 16 and the magnets 20 are illustrated as spaced from each other, for the convenience of explanation, the pole-faces are brought into direct contact in the vibrating element 10 of this embodiment. The cushioning 16 is compressed by a stress larger than the maximum repelling force between the adjacent pole-faces.

As illustrated in FIG. 5, the first magnets 20a, 20b are applied with same forces $F_{12}$ and $F_{43}$ from the left and right in direct opposition, so that the first magnets 20a, 20b relatively stand still. Similarly, at the second magnet 20c, force $F_{21}$ applied from the first magnet 20a (sum of magnetic repelling force applied from the first magnet 20a and counterforce against the pressurizing force) and restoration force Fr of the cushioning 16 are in balance. Accordingly, if the restoration force of the compressed cushioning 16 is larger than the maximum repelling force between the magnets 20, the plurality of magnets 20 arranged so as to oppose the same pole-faces are brought into close contact without leaving a gap in between, and are pressurized against each other under a predetermined pressurizing force. In this embodiment, since the first magnets 20a, 20b are larger in the magnetism than the second magnets 20c, 20d, so that the maximum repelling force generates between the first magnets 20a and 20b, that is, between the pole-faces 21N and 22N. Since the restoration force of the cushioning 16 is larger than the maximum repelling force, so that the magnets 20 (first magnets 20a, 20b and second magnets 20c, 20d) are brought into close contact without leaving a gap in between. Now "the cushioning 16 is compressed by a stress larger than the maximum repelling force between the pole-faces" means that the compressive stress applied from the end supporting portion 12 and exerted on the cushioning 16 is larger than a quotient obtained by dividing the maximum repelling force of the magnet 20 by a contact area with the cushioning 16.

The restoration force Fr of the cushioning 16 is preferably 1.1 times or more as large as the maximum repelling force between the magnets 20, and twice or less as large as the maximum repelling force. By the adjustment, the adjacent magnets 20 are kept in close contact under a pressurizing force ranging from 0.1 times to 1 time as large as the maximum repelling force, so that the magnets 20 are prevented from separating from each other when the vibrating element 10 travels through the coils 40. In the above-described range, the pressurizing force to be exerted on the magnets 20 is prevented from being excessive, and thereby the magnets 20 may be prevented from being collapsed under pressure. More specifically, given the maximum repelling force of the magnets 20 as 2 kgf (ca. 20 N), the end supporting portions 12, 13 are preferably formed by caulking the core component 18 so as to adjust the restoration force Fr of the cushioning 16 to 3 kgf or around (ca. 30 N).

Referring now back to FIG. 2, the through-hole 26e of the cushioning 16, when compressed by the end supporting portion 12 and the magnets 20, has a diameter smaller than the outer diameter of the end supporting portion 12. Accordingly, the cushioning 16 (O-ring) is prevented from escaping from the end supporting portion 12.

Which of the end supporting portions 12 and 13 is larger or smaller in the flange diameter is arbitrary, and the both may have the same flange diameter. In this embodiment, the end supporting portions 12, 13 provided at both ends of the vibrating element 10 are formed into flanges with different outer diameters. The cushioning 16 is disposed between the end supporting portion (end supporting portion 12, in this embodiment), having a larger flange diameter chosen between the end supporting portions 12, 13, and the magnets 20. By virtue of this configuration, the pressurizing force is successfully transmitted from the end supporting portions 12, 13 via the cushioning 16 to the magnets 20.

Processes of manufacturing the vibrating element 10 will be briefed below. First, the repelling force between the first magnets 20a, 20b, which corresponds to the maximum repelling force between the magnets 20, is measured. Since the repelling force is generally proportional to volume of the magnet, so that if the diameter of the magnet is kept constant, the longer the magnets (first magnets), the larger the repelling force between them. Next, one end of the core component 18 is forged to form the end supporting portion 12, and the cushioning 16 (O-ring) is attached to the core component 18. Next, the second magnet 20c, the first magnets 20a, 20b, and the second magnet 20d are attached in this order to the core component 18, and the other end of the core component 18 is caulked to form the flange-form end supporting portion 13. By increasing length of caulking (flange diameter) of the end supporting portion 13, axial length of the core component 18 becomes shorter, and thereby the magnets are compressed more tightly. Therefore, the axial length of the core component 18 or the flange diameter of the end supporting portion 13 is preliminarily set, so that the pressure compressing the cushioning 16 (O-ring) will be larger than the maximum repelling force between the magnets. The end supporting portion 13 is then formed so as to adjust the axial length of the core component 18 or the flange diameter of the end supporting portion 13 to the predetermined value preliminarily set as described above. In this way, the magnets 20 are brought into close contact while keeping the cushioning 16 compressed. It is also preferable to additionally dispose a second cushioning between the end supporting portion 13 and the second magnet 20d.

Each of the first magnets 20a, 20b and the second magnets 20c, 20d in this embodiment has an annular form, wherein the outer diameter of the second magnets 20c, 20d is smaller than the outer diameter of the first magnets 20a, 20b. The outer diameter of the end supporting portions 12, 13 is smaller than the outer diameter of the first magnets 20a, 20b, and is further smaller than the outer diameter of the second magnets 20c, 20d. By virtue of this configuration, when the vibrating element 10 vibrates inside the pipe 30, the first magnets 20a, 20b which are thicker and mechanically stronger than the second magnets 20c, 20d are brought into contact with the inner circumferential surface of the pipe 30. The second magnets 20c, 20d, which configure fragile portions of the vibrating element 10, may therefore be prevented from being worn, and thereby the vibrating element 10 may be improved in the durability.

In addition, since there is a clearance between the magnets 20 and the inner circumferential surface of the through-holes 26, the magnets 20 may successfully be prevented from being worn when the core component 18 is inserted therethrough. In this case, the axial center position of the second magnets 20c, 20d and the axial center position of the first magnets 20a, 20b may be misaligned.

Figure 6:
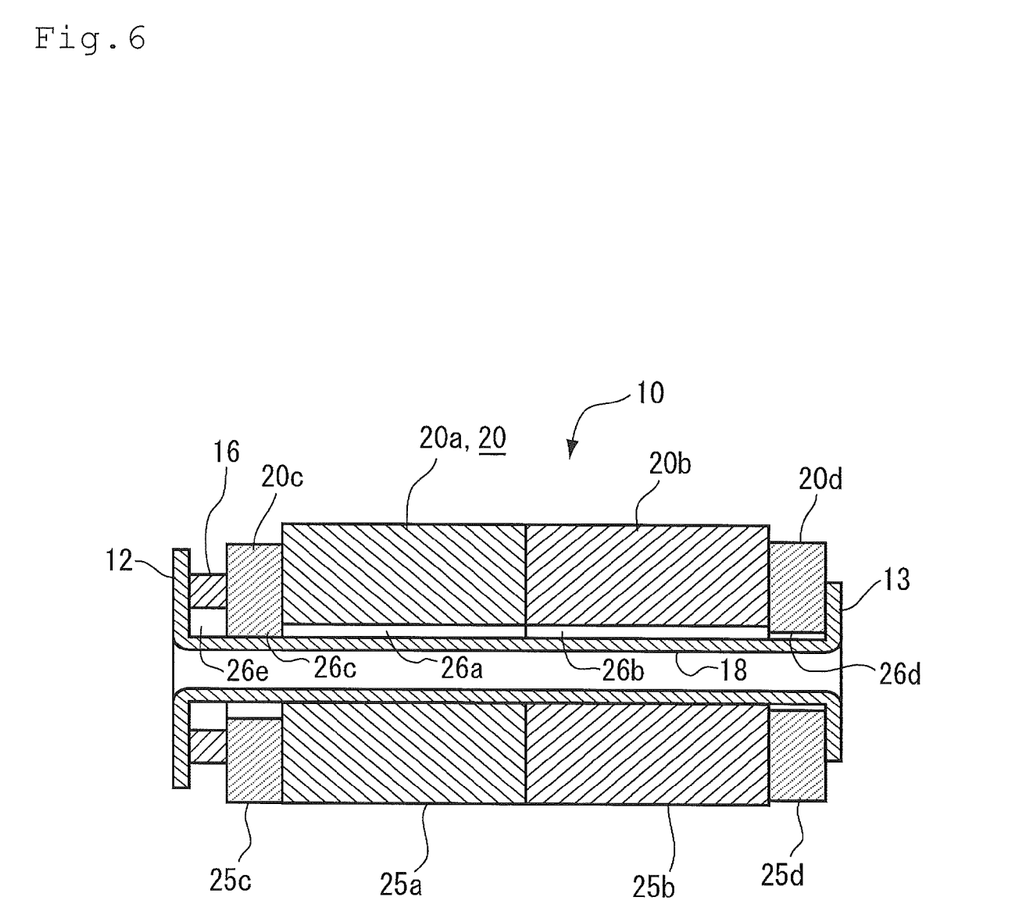
FIG. 6 A longitudinal cross sectional view illustrating first magnets and one of the second magnets attached to a core component in a decentered manner.

FIG. 6 is a longitudinal cross sectional view illustrating the first magnets 20a, 20b and the second magnet 20c attached to a core component in a decentered manner. The second magnet 20c is attached to the core component 18, as decentered downward in FIG. 6, whereas the first magnets 20a, 20b are attached as decentered upward in FIG. 6. Even in such state, the outer circumferential surface 25c of the second magnet 20c of this embodiment will not protrude out from the outer circumferential surfaces 25a, 25b of the first magnets 20a, 20b. Accordingly, even if the magnets 20 are attached to the core component 18 in a decentered manner, the outer circumferential surface 25c of the second magnet 20c is prevented from being brought into contact with the inner circumferential surface of the pipe 30, when the vibrating element 10 vibrates inside the pipe 30. Accordingly, in the vibrating element 10 of this embodiment, the sum of the radial width of the annular second magnet 20c and the diameter gap between the through-hole 26c and the core component 18 preferably does not exceed the radial width of the first magnets 20a, 20b. The same will also apply to the outer circumferential surface 25d of the second magnet 20d.

Also when there is a step 36 between the terminal cover 33 and the flange 31 as illustrated in FIG. 1, the second magnets 20c, 20d do not collide against the step 36 in this embodiment, since the outer circumferential surfaces 25c, 25d of the second magnets 20c, 20d do not protrude in the radial direction out from the outer circumferential surfaces 25a, 25b of the first magnets 20a, 20b. In this way, the second magnets 20c, 20d may be prevented from being worn, and thereby the vibrating element 10 may be improved in the durability.

The embodiment permits various modifications.

In the embodiment described above, each of the plurality of magnets was provided with a through-hole, and therethrough the core component was inserted to thereby arrange the magnets in a row. The embodiment may be replaced by a style having the magnets enclosed in the metal pipe.

Figure 7A:
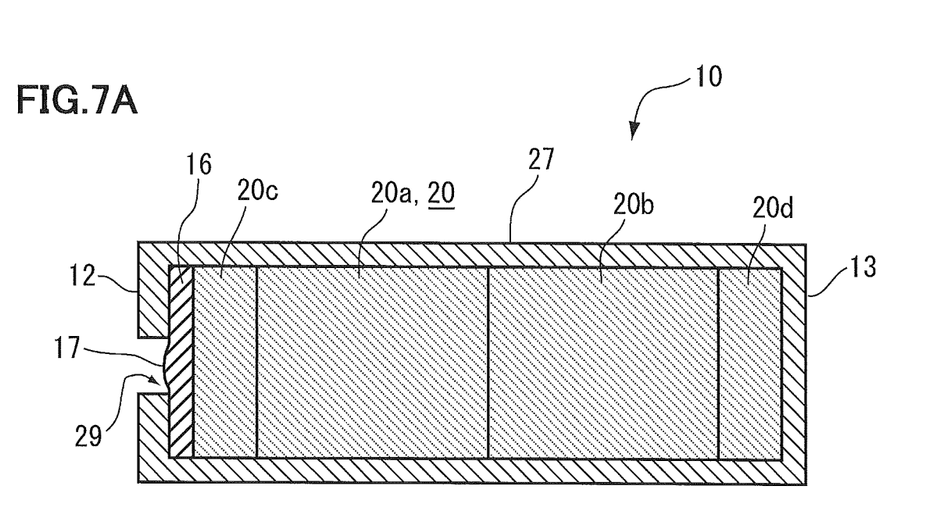
Figure 7B:
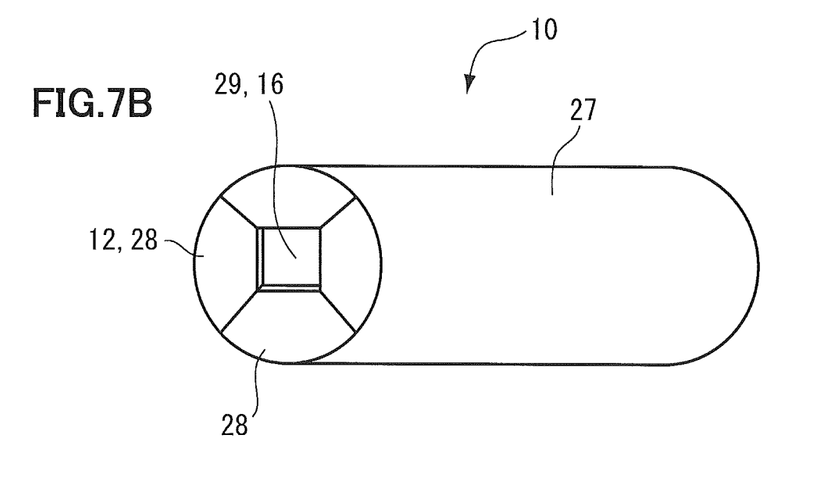
FIG. 7B is a perspective view schematically illustrating the vibrating element illustrated in FIG. 7A.

FIG. 7A is a longitudinal cross sectional view of a vibrating element 10 according to a modified example, taken along the axis of vibration. FIG. 7B is a perspective view schematically illustrating the vibrating element 10.

In the vibrating element 10 in this modified example, the magnets 20 are housed in a metal pipe 27 composed of a non-magnetic material, the end supporting portions 12, 13 are respectively formed at both ends of the metal pipe 27, and the end supporting portion 12 having the cushioning 16 disposed adjacent thereto has formed therein a window 29 through which a part of the cushioning 16 exposes.

The configuration will be explained in more detail. The vibrating element 10 in this modified example encloses, in a metal pipe 27 composed of a non-magnetic metal material, a plurality of magnets 20 (first magnets 20a, 20b and second magnets 20c, 20d) arranged while opposing the same pole-faces under pressure. The metal pipe 27 is given in the form of a bottomed cylinder opened at one end. The bottom corresponds to the end supporting portion 13. The opened end is forged under a predetermined pressure into the end supporting portion 12, so as to confine the magnets 20 and the cushioning 16. The cushioning 16 may be disposed between the end supporting portion 12 and the magnet 20 (second magnet 20c). The cushioning 16 may alternatively be interleaved between the end supporting portion 13 and the magnet 20 (second magnet 20d). The cushioning 16 may still alternatively be interleaved both between the end supporting portion 12 and the second magnet 20c, and between the end supporting portion 13 and the second magnet 20d. The cushioning 16 is housed in the metal pipe 27, while being compressed to a predetermined thickness, down from the natural state without being loaded with any external stress.

The end supporting portion 12 in this modified example is composed of a plurality of (four, in this case) folding tabs 28. The folding tabs 28 are derived from the circumferential wall of the metal pipe 27 notched and folded towards the axial center. The end supporting portion 12 has formed therein a window 29 as an opening formed by abutting the folding tabs 28, allowing a part of the cushioning 16 to expose therein. The cushioning 16 compressed inside the metal pipe 27 swells out to form a swelled portion 17 in the opening 29 where the pressurizing force by the folding tabs 28 does not act. By visually observing the presence or absence of the swelled portion 17 through the window 29, whether the magnets 20 are pressurized without leaving a gap in between under a predetermined pressurizing force or not may be confirmed. It is therefore preferable to form the window 29, allowing a part of the cushioning 16 to expose therein, in the end supporting portion 12, 13 having the cushioning 16 disposed adjacent thereto.

It is apparent that the present invention is not limited to the above embodiment, and may be modified and improved so long as the objective of the present invention may be achieved.

The embodiments above also include the technical spirits below.

(1) A vibration-powered generator which includes:
a vibrating element having:
a plurality of magnets arranged so as to oppose the pole-faces of the same polarity;
end supporting portions which support the plurality of magnets from both ends in the direction of arrangement; and
a cushioning held between the end supporting portion and the magnets, while being compressed under a stress exceeding the repelling force between the pole-faces, so as to keep the plurality of magnets in a row without leaving a gap in between, overcoming the repelling force,
and
a coil arranged around the vibrating element,
the vibration-powered generator being configured to obtain electromotive force by moving the vibrating element relatively to the coil;

(2) The vibration-powered generator according to (1), wherein the cushioning is compressed by a stress larger than the maximum repelling force between the adjacent pole-faces, so as to ensure a direct contact between the pole-faces;

(3) The vibration-powered generator according to (2), wherein each of the magnets and the cushioning has a through-hole formed therein,
the vibrating element further has a core component, configured to be inserted through the through-holes and to have the end supporting portions formed on both ends, and
the through-hole of the cushioning in the compressed state has a diameter smaller than the outer diameter of the end supporting portions;

(4) The vibration-powered generator according to (3), wherein the end supporting portions provided to both ends of the vibrating element are formed into flanges with different outer diameters, and the cushioning is disposed between the end supporting portion with a larger diameter and the magnets; and (5) The vibration-powered generator according to (1) or (2), wherein the magnets are housed in a metal pipe composed of a non-magnetic material, the end supporting portions are respectively formed at both ends of the metal pipe, and the end supporting portion having the cushioning disposed adjacent thereto has formed therein a window through which a part of the cushioning exposes.

This application claims priority right based on Japanese Patent Application No. 2011-063154 filed on Mar. 22, 2011, the entire content of which is incorporated hereinto by reference.

The invention claimed is:

1. A vibration-powered generator comprising:
a vibrating element having:
    a plurality of magnets arranged so as to oppose the pole-faces of the same polarity;
    end supporting portions which support the plurality of magnets from both ends in the direction of arrangement; and
    a cushioning held between the end supporting portion and the magnets, while being compressed under a stress exceeding the repelling force between the pole-faces, so as to keep the plurality of magnets in a row without leaving a gap in between, overcoming the repelling force, and
a coil arranged around the vibrating element, the vibration-powered generator being configured to obtain electromotive force by moving the vibrating element relatively to the coil, and
wherein the end supporting portions provided to both ends of the vibrating element are formed into flanges with different outer diameters, and the cushioning is disposed between the end supporting portion with a larger diameter and the magnets.

2. The vibration-powered generator according to claim 1, wherein the cushioning is compressed by a stress larger than the maximum repelling force between the adjacent pole-faces, so as to ensure a direct contact between the pole-faces.

3. The vibration-powered generator according to claim 2, wherein each of the magnets and the cushioning has a through-hole formed therein,
the vibrating element further has a core component, configured to be inserted through the through-holes and to have the end supporting portions formed on both ends, and
the through-hole of the cushioning in the compressed state has a diameter smaller than the outer diameter of the end supporting portions.

4. The vibration-powered generator according to claim 2, wherein the magnets are housed in a metal pipe composed of a non-magnetic material, the end supporting portions are respectively formed at both ends of the metal pipe, and the end supporting portion having the cushioning disposed adjacent thereto has formed therein a window through which a part of the cushioning exposes.

5. The vibration-powered generator according to claim 1, wherein the magnets are housed in a metal pipe composed of a non-magnetic material, the end supporting portions are respectively formed at both ends of the metal pipe, and the end supporting portion having the cushioning disposed adjacent thereto has formed therein a window through which a part of the cushioning exposes.

6. A vibration-powered generator comprising:
a vibrating element having:
    a plurality of magnets arranged so as to oppose the pole-faces of the same polarity;
    end supporting portions which support the plurality of magnets from both ends in the direction of arrangement; and
    a cushioning held between the end supporting portion and the magnets, while being compressed under a stress exceeding the repelling force between the pole-faces, so as to keep the plurality of magnets in a row without leaving a gap in between, overcoming the repelling force, and
a coil arranged around the vibrating element, the vibration-powered generator being configured to obtain electromotive force by moving the vibrating element relatively to the coil,
wherein the cushioning is compressed by a stress larger than the maximum repelling force between the adjacent pole-faces, so as to ensure a direct contact between the pole-faces, wherein each of the magnets and the cushioning has a through-hole formed therein,
wherein the vibrating element further has a core component, configured to be inserted through the through-holes and to have the end supporting portions formed on both ends,
wherein the through-hole of the cushioning in the compressed state has a diameter smaller than the outer diameter of the end supporting portions, and
wherein the end supporting portions provided to both ends of the vibrating element are formed into flanges with different outer diameters, and the cushioning is disposed between the end supporting portion with a larger diameter and the magnets.

7. A vibration-powered generator comprising:
a vibrating element having:
    a plurality of magnets arranged so as to oppose the pole-faces of the same polarity;
    end supporting portions which support the plurality of magnets from both ends in the direction of arrangement; and
    a cushioning held between the end supporting portion and the magnets, while being compressed under a stress exceeding the repelling force between the pole-faces, so as to keep the plurality of magnets in a row without leaving a gap in between, overcoming the repelling force,
wherein the end supporting portions provided to both ends of the vibrating element are formed into flanges with different outer diameters, and the cushioning is disposed between the end supporting portion with a larger diameter and the magnets.

* * * * *